INVENTOR.
Anthony J. Fresolo

INVENTOR.
Anthony J. Fresolo

United States Patent Office 3,509,316
Patented Apr. 28, 1970

3,509,316
DEFROSTER FOR GAS BRAKING SYSTEM
Anthony J. Fresolo, 652 Hillside Ave.,
Arlington, Mass. 02174
Filed Oct. 30, 1967, Ser. No. 679,085
Int. Cl. H05b 3/78, 3/00
U.S. Cl. 219—201                                                          4 Claims

ABSTRACT OF THE DISCLOSURE

This disclosure depicts a gas braking system especially suited for use in trucking vehicles of the tractor-trailer type, and more particularly depicts apparatus for defrosting gas braking systems by direct and intimate contact of a thermally excited mass with the gaseous, pressure-transmitting medium in the system.

BACKGROUND OF THE INVENTION

It is well known by the trucker that cold weather brings with it braking system freeze-up with the attendant inconveniences and often danger to life and property. Moisture in the gaseous medium in the system condenses and collects in low points in the system, particularly in the valves (especially the relay-emergency valve) and the reservoir tanks. Sub-freezing weather causes this condensate to freeze, usually during periods of non-use but occasionally while a vehicle is in operation, rendering the braking system partially or totally inoperative until such time as the freeze-up can be cleared by hammer, blow-torch or whatever means are available.

Various apparatus has been devised for defrosting gas braking systems to alleviate the described problem; however, each approach has involved an attempt to heat the gaseous medium within the system, or a particular component of the system, by transmitting thermal energy through the walls of the conduits, valves, or tanks to the gaseous medium or frozen condensate contained therein. Such apparatus is slow and inefficient because of the high heat losses to the cold environment surrounding the system.

OBJECTS OF THE INVENTION

It is an object of this invention to provide defrosting means for gas braking systems which effects an application of thermal energy directly to the gaseous medium within the system and which is therefore rapid and efficient in operation.

It is another object of this invention to provide a defrosting device for gas braking systems which is adapted for use with commercially available braking systems with need for only a minimum of auxiliary structure and which device may be rapidly and simply installed.

It is a further object of this invention to provide defrosting means for gas braking systems which is simple and relatively inexpensive and which uses a readily available energy source.

Further objects and advantages of this invention will in part be obvious and will in part become apparent as the following description proceeds. The features of novelty which characterize the invention will be pointed out with particularity in the claims annexed to and forming a part of this specification.

SUMMARY OF THE INVENTION

This invention concerns a gas braking system including conduit means adapted to communicate with gas compressing means and at least one brake chamber and defrosting means for establishing within the conduit means and in direct and intimate contact with a gaseous medium within the conduit means a mass thermally excitable to a level of thermal energy greater than that possessed by the medium.

For a fuller understanding of the invention, reference may be had to the following detailed description taken in connection with the accompanying drawings wherein.

DESCRIPTION OF THE PREFERRED EMBODIMENTS

Figure 1:
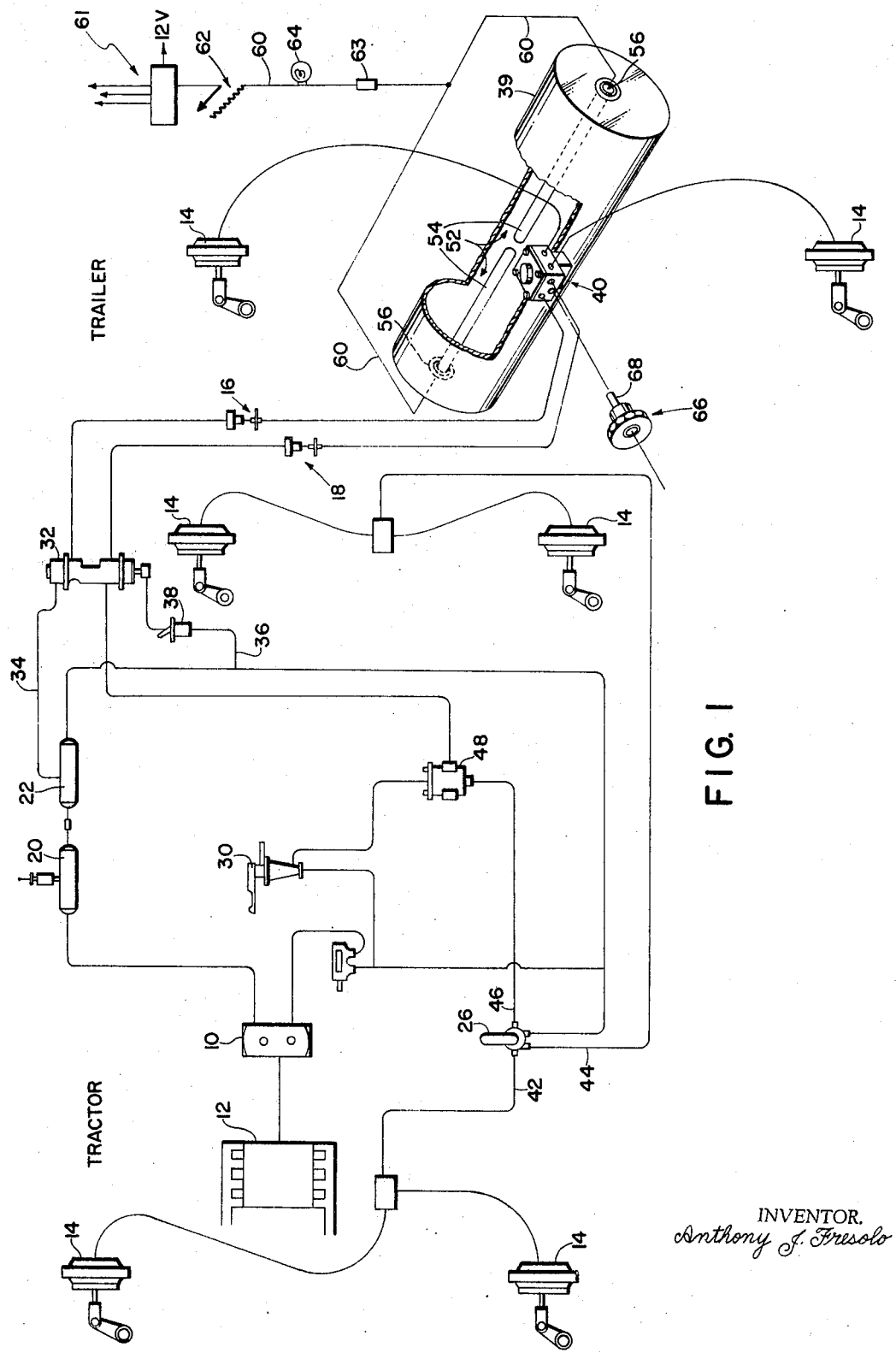
FIGURE 1 is a schematic representation of a gas braking system incorporating a preferred embodiment of the invention shown in perspective in distorted scale and partially broken away.

FIGURE 1 shows a structural implementation of the inventive concepts embodied in an otherwise conventional air braking system for a tractor-trailer type trucking vehicle. Before entering into a description of the invention, the essential parts of an air braking system will be briefly described.

Referring to FIGURE 1, the illustrated braking system comprises a network of conduits communicating with an air compressor 10 driven by an internal combustion engine 12, and with a plurality of brake chambers 14 wherein air pressure generated by the compressor 10 may be applied to impart force to associated brake shoes (not shown).

With the trailer components connected in the system through couplings 16 and 18 and the pressure in the system at an appropriate operating level, pressure generated in the compressor 10 is applied at the following points in the system: tractor reservoir tanks 20, 22; a foot-operated brake valve 26; a hand-operated brake valve 30; at one port of tractor protection valve 32 through line 34 and at a second port of the valve 32 through a second line 36 including a control valve 38; and in the trailer at a trailer reservoir tank 39 and at the emergency side of a relay-emergency valve 40.

Upon actuation of brake valve 26, reservoir pressure is applied to each of the two sets of tractor brake chambers 14 through outlet lines 42 and 44 from the valve 26 and to the trailer set of brake chambers 14 through outlet line 46, a double check valve 48, the tractor protection valve 32 and relay-emergency valve 40. Actuation of the hand-operated brake valve 30 is effective to cause reservoir pressure to be applied to the trailer set of brake chambers 14 through double check valve 48 and the tractor protection valve 32 and relay-emergency valve 40.

As is conventional, actuation of control valve 38 to close line 36 before disengagement of the trailer from the tractor causes the trailer brakes to be applied by the actuation of the tractor protection valve 32 and relay-emergency valve 40.

By this invention defrosting means are provided for establishing within the conduit network and in direct and intimate contact with the gaseous medium within the conduit network a mass which is thermally excitable to a level of thermal energy greater than the medium possesses, whereby a rapid and efficient defrosting of frozen condensate in the system may be effected. In a preferred embodiment of such defrosting means, an electrical resistance heating element is mounted in a plug adapted to fit an auxiliary opening in a component of the conduit network.

Figure 2:
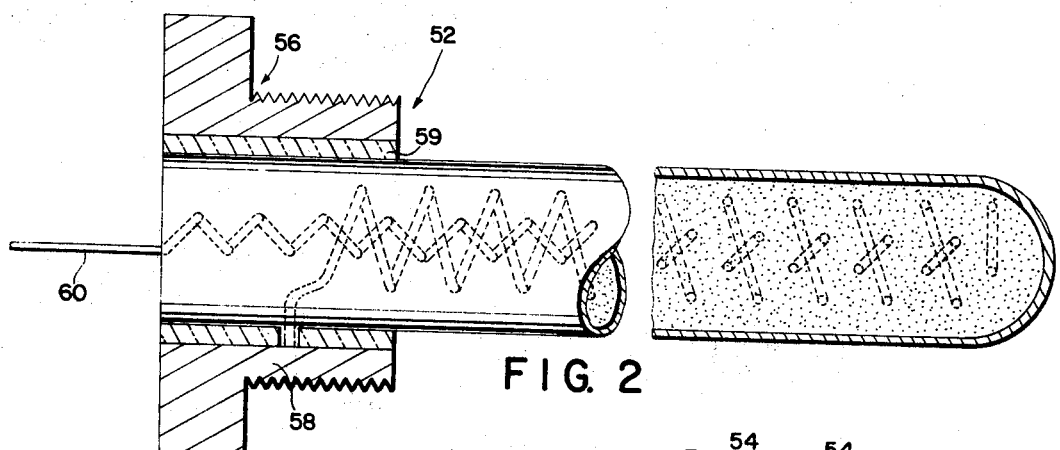
FIGURE 2 is a schematic side elevation partially sectioned view of a defrosting device according with the teachings of the invention.

FIGURES 1 and 2 show a pair of identical defrosting devices 52, each having electrical resistance elements 54 mounted in plugs 56 adapted to fit inspection openings in opposite ends of a trailer reservoir tank 39. The resistance elements are preferably of the sheathed-type having a doubled, coiled electrical conductor 57 mounted axially therein. One end of the conductor 57 is preferably grounded to an electrically conductive body 58 of the plug 56 for grounding the conductor 57 to the tank 39.

An insulating sleeve 59 electrically isolates the conductor 57 from the plug body 58 except where the grounding connection is passed therethrough. Electrical power, preferably derived from the vehicle electrical system, for example from an independent line, or alternatively, as shown, from a spare line 60 normally provided in loom 61, is applied to the conductors 57. A switch 62, fuse 63, and pilot light 64 completes the electrical circuit. In the FIGURE 1 embodiment, a pair of such devices are substituted for removable plugs normally received in the inspection openings in the tank 39.

A critical point in the system in terms of likelihood of freeze-up is the relay-emergency valve 40, normally mounted medially on the tank 39 and having a port (not shown) in communication with the tank interior. By a proper design of the defrosting devices 52, considering such parameters as length, and heat distribution characteristics, if desired, a maximum amount of heat can be caused to be generated in the proximity of this port at the junction between the valve 40 and the tank 39. With the novel defrosting devices of this invention, freeze-ups in the tank 39 and/or relay-emergency valve 40 can be rapidly cleared due to the direct application of the full amount of heat energy generated to critical spaces *within* the interior of the system without the need for effecting heat transfer through the walls of the conduit network with attendant heat, time, and power losses.

Figure 3:
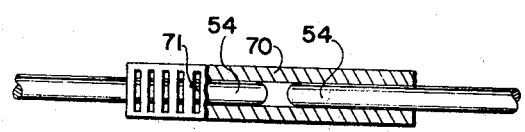
FIGURE 3 is a view of yet another embodiment of the invention including a supporting sleeve member bridging the free ends of cantilevered defrosting devices to provide support therefor.

In order to support the free ends of resistance elements 54 extending cantilevered into the gaseous medium within tank 39, a sleeve, for example as shown at 70 in FIGURE 3, may be provided. The sleeve 70 is composed of Bakelite (trademark of the Union Carbide Chemical Company) or a similar heat-resistant material and has perforations 71 or the like for passing heat energy outwardly from the resistance elements 54 into the surrounding space.

It is also contemplated that a defrosting device similar to those shown at 52 may be adapted for location directly in the valve 40 itself in an unused auxiliary port. FIGURE 1 shows such a plug 66 similar in construction to devices 52, but having a resistance element 68 which is modified in accordance with the physical limitations imposed by the interior structure of the valve 40. The plug 66 would be connected into the vehicle electrical system in the same manner as devices 52.

Figure 4:
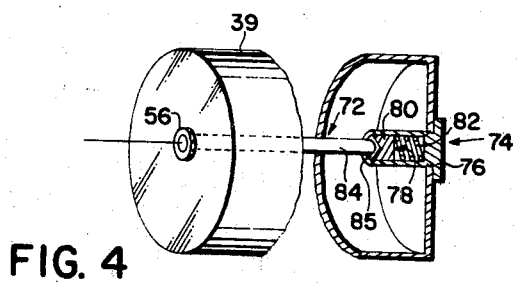
FIGURE 4 is a schematic partially sectioned, side elevation view of still another structure by which the invention may be implemented, including a plug means received in an auxiliary opening in one end of a reservoir tank for supporting the free end of a defrosting device mounted to extend into the interior of the tank in accordance with the invention.

FIGURE 4 shows yet another alternate embodiment of the invention wherein a single defrosting device 72, similar to the devices 52, described above, extends axially substantially the full length of the tank 39. To provide support for the free end thereof, a support plug 74 is preferably provided. Referring to FIGURE 4, such a plug 74 may comprise a body 76 having a hollow bore 78 opening at the interior end thereof. A piston 80 slideably received in the bore 78 is spring-biased by a coil spring 82 toward the free end of the resistance element 84 of device 72. A recess 85, for example, cone-shaped, diverging outwardly toward the open end of bore 78 receives the free end of resistance element 84 to offer a firm support therefor.

Figure 5:
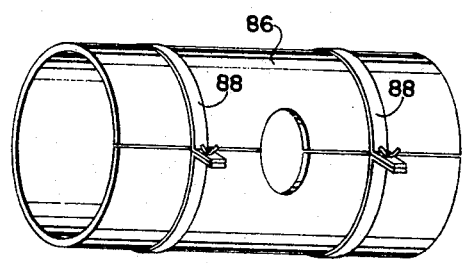
FIGURE 5 is a schematic perspective view of an insulating cover which may be located on a reservoir tank to enhance the defrosting action of apparatus implementing the inventive concepts.

To enhance the operation of the defrosting devices described above, an insulating cover may be provided for mounting about the tank 39, as shown at 86 in FIGURE 5. Straps 88 may be provided for securing the cover 86 on the tank 39.

Figure 6:
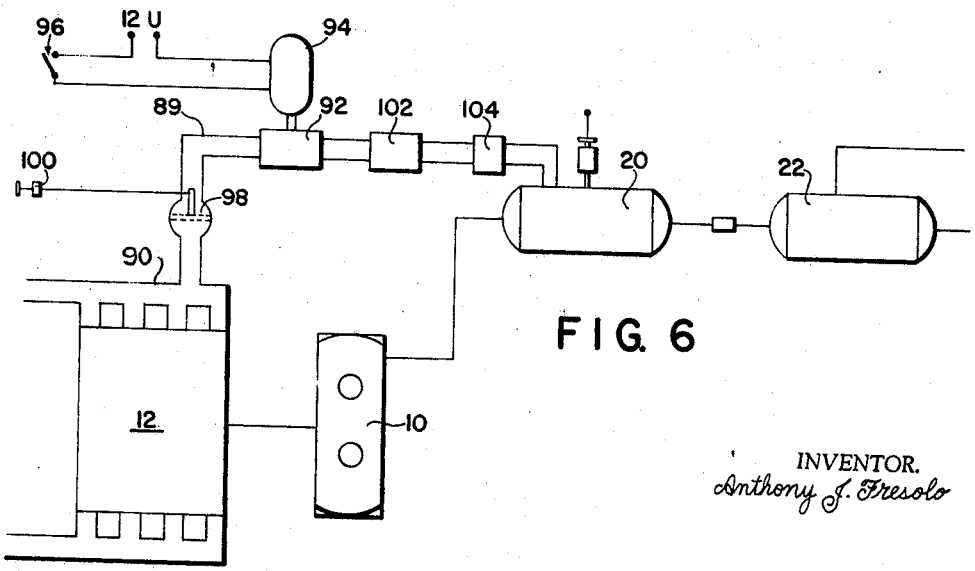
FIGURE 6 is a schematic view of still another alternate embodiment of the invention.

FIGURE 6 shows yet another way a thermally excited mass may be established *within* the conduit network in direct and intimate contact with the pressure-transmitting gaseous medium within the network in accordance with the invention. The FIGURE 6 embodiment does not utilize a conversion of electrical to thermal energy, as in the above-described embodiments, but rather uses the thermal energy in exhaust gases from the internal combustion engine 12 driving the compressor 10 to defrost a braking system.

Referring to FIGURE 6, an auxiliary conduit 89 is provided, connected between the exhaust manifold 90 of engine 12 and the tractor reservoir tank 20. In order that the defroster may be employed while the braking system is at a positive pressure, a pump 92 is preferably provided, being driven by an electric motor 94 powered by the electrical system for the vehicle and controlled, for example, by a switch 96. A control valve 98 in the auxiliary conduit 89 for controlling the flow of hot exhaust gases into the system is preferably actuated by a manual operator 100. A one-way valve 102 and a filter 104 for removing unwanted components from the exhaust gases are desirable components of this embodiment.

In operation, to defrost a frozen braking system, the vehicle operator need only start the engine 12 and after a brief warm-up period, open control valve 98, throw switch 96 and pump the foot-operated brake valve (see element 26 in FIGURE 1) to effect a flow of hot, filtered exhaust gases into the braking system.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed as novel, useful and unobvious and is desired to be secured by Letters Patent of the United States is:

1. In a tractor-trailer air braking system including an air compressor, a plurality of trailer brake chambers, an air conduit network interconnecting said compressor and said brake chambers, and a trailer air reservoir tank in said network having therein a first threaded inspection opening and a second threaded inspection opening located in a portion of the tank opposite a portion containing said first opening, the improvement comprising:

a first electrical resistance element adapted for connection to a source of electrical power;
switch means for controlling the energization of said first resistance element;
a first threaded plug means adapted to screw into said first inspection opening in said trailer reservoir tank with a substantially hermetic seal, and first plug means providing a cantilever support for said resistance element such that when said first plug means is received in said first opening, said first resistance element is caused to extend into the interior of said tank into direct and intimate contact with the gaseous medium within the tank;
a second resistance element adapted for connection to said source of power;
a second threaded plug means adapted to screw into said second inspection opening and to support said second resistance element in a cantilever fashion in the interior of said tank in coaxial spaced relationship to said first resistance element; and a rigid tubular sleeve receiving one of said resistance elements in each end thereof to offer support for said elements, whereby upon energization of said elements to a state of thermal excitation greater than that of the gaseous medium to defrost the tank, a transfer of thermal energy from said elements to the medium is effected.

2. In a tractor-trailer air braking system including an air compressor, a plurality of trailer brake chambers, an air conduit network interconnecting said compressor and said brake chambers, and a trailer air reservoir tank in said network having therein a first threaded inspection opening and a second threaded inspection opening located in a portion of the tank opposite a portion containing said first opening, the improvement comprising:

an electrical resistance element adapted for connection to a source of electrical power;

switch means for controlling the energization f said electrical resistance element;

a first threaded plug means adapted to screw into said first inspection opening in said trailer reservoir tank with a substantially hermetic seal, said plug means providing an cantilever support for said resistance element such that when said plug means is received in said first opening, said resistance element is caused to extend into the interior of said tank into direct and intimate contact with the gaseous medium within the tank; and a second threaded plug means adapted to screw into said second inspection opening, said second plug means having a cup-shape recess for receiving and supporting the free end of said resistance element against vibration and the like, whereby upon energization of said element to a state of thermal excitation greater than that of the gaseous medium to defrost the tank, a transfer of thermal energy from said element to the medium is effected.

3. The system defined by claim 2 wherein said second plug means includes an open-ended bore receiving a spring-biased piston, said piston containing said recess in its outer end, said second plug means resiliently receiving and supporting the free end of said resistance element.

4. The apparatus as defined by claim 2 wherein said air braking system further includes a relay-emergency valve and wherein said improvement further includes:

a third electrical resistance element adapted for connection to said source of electrical power;

switch means for controlling the energization of said third electrical resistance element; and third threaded plug means adapted to screw into a port in said valve with a substantially hermetic seal, said third plug means providing a cantilever support for said third resistance element such that when said third plug means is received in the port said third resistance element is caused to extend into the interior of said valve into direct and intimate contact with the gaseous medium within the valve, whereby upon energization of said third element to a state of thermal excitation greater than that of the gaseous medium to defrost the valve, a transfer of thermal energy from said element to the medium is effected.

References Cited

UNITED STATES PATENTS

| | | | |
|---|---|---|---|
| 1,985,280 | 12/1934 | Charleton | 338—316 X |
| 2,058,769 | 10/1936 | Brown | 219—312 X |
| 2,232,327 | 2/1941 | Hobald | 13—25 |
| 2,271,838 | 2/1942 | Hannawalt et al. | 13—25 X |
| 2,208,756 | 7/1940 | Farmer | 303—1 X |
| 2,538,274 | 1/1951 | Sanmori | 188—154 X |
| 2,666,126 | 1/1954 | Raines. | |
| 2,689,905 | 9/1954 | Harris | 219—316 |
| 2,979,074 | 4/1961 | Yanda | 303—1 X |

FOREIGN PATENTS 1,291,888  3/1962  France.

JOSEPH V. TRUHE, Primary Examiner

P. W. GOWDEY, Assistant Examiner

U.S. Cl. X.R.

180—64; 188—154; 219—312, 316; 303—1